United States Patent

[11] 3,571,862

[72] Inventor Albert W. Zemek
R.D. #6, Binghamton, N.Y. 13904
[21] Appl. No. 785,583
[22] Filed Dec. 20, 1968
[45] Patented Mar. 23, 1971

[54] BELTED AXIAL LEAD ELECTRONIC COMPONENT SPLICING CLIP
6 Claims, 7 Drawing Figs.

[52] U.S. Cl. .......... 24/36, 24/38
[51] Int. Cl. .......... F16q 3/00
[50] Field of Search .......... 24/36, 35, 38, 23 (W), 23 (EE), 23, 123 (W), 129 (W)

[56] References Cited
UNITED STATES PATENTS

| | | | |
|---|---|---|---|
| 308,785 | 12/1884 | Moore | 24/36 |
| 462,260 | 11/1891 | Kenehan | 24/36UX |
| 2,319,334 | 5/1943 | MacChesney | 24/23(W) |
| 2,881,915 | 4/1959 | Koehler et al. | 24/23(W)X |
| 3,045,303 | 7/1962 | Wade | 24/123(W)X |
| 3,078,533 | 2/1963 | Allen | 24/123(W)X |

*Primary Examiner*—Billy S. Taylor
*Attorney*—Fidelman, Wolffe and Leitner

ABSTRACT: A splicing clip for attaching two ends of tape of belted equally spaced axial lead electronic components, the clip including a base with upstanding bendable slide clasp portions of generally triangular configuration in direct juxtaposition on two sides of said base and separated on the sides of the base by a distance substantially equal to the diameter of the axial lead. The ends of the tapes are placed on the base with at least the last two axial leads on each end of each tape resting in the separations between the clasps and thereafter the clasps are bent over the surface of the tape not in contact with the base.

PATENTED MAR 23 1971 3,571,862

INVENTOR
ALBERT W. ZEMEK
Fidelman, Wolffe & Leitner
ATTORNEYS

BELTED AXIAL LEAD ELECTRONIC COMPONENT SPLICING CLIP

This invention relates to means for connecting belts of axial lead electronic components and more specifically to a splicing clip which interconnects the tapes used to hold the leads thereof. Specifically, this invention is directed to a splicing clip which is intermeshed between the leads of the last components on each end of mating tape section and bent around the tapes whereby the tapes are bound and the axial leads are equally spaced through the connection area.

The use of belted axial lead electronic components (diode, etc.) has become in recent years one of the most convenient handling tools for the electronics industry. The leads of components in this form are prestraightened and aligned, and equally spaced on the belt so that they may be fed directly into insertion machines, sequencers or testing devices without intermediate handling. However, in operation of these devices, the belted components are retained on reels which are not endless so either the machines must be shut down periodically to change reels or the end of one reel adhered to another to provide continuous operation. Furthermore, breaks sometimes occur which must be quickly repaired. To splice the belts speedily for these situations, it is essential that the belts of components not only adhere to one another but also that proper spacing between the components be maintained. Staples or glue generally do not insure the spacing while the former will jam equipment due to inability to flex under, for example, rotary indexing and the latter is difficult to handle and may not bind sufficiently in the short time periods before the belt enters the operating area.

Therefore, it is an object of the instant invention to provide a device for splicing the ends of or breaks in tapes of belted axial lead components which is quick and easy to handle and apply and which when used maintains equal uniform spacing between components.

It is a further object of the instant invention to provide a device for splicing tapes of belted components which is flexible and may be utilized with all types of component-handling or dispensing equipment.

It is a still further object of the instant invention to provide a splicing device which may be easily packaged for bulk shipment.

These and other objects of the present invention will become apparent from the following description taken with the accompanying drawing in which.

Figure 1:
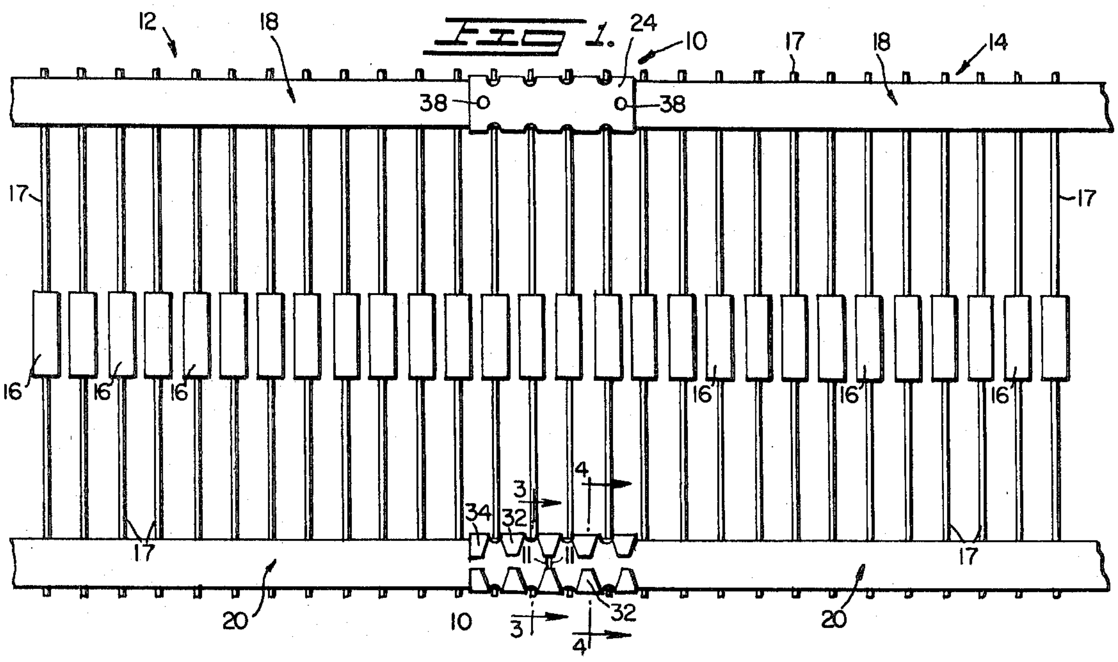
FIG. 1 is a top plan view of belt of electronic components spliced together by splicing clips of the instant invention.
Figure 3:
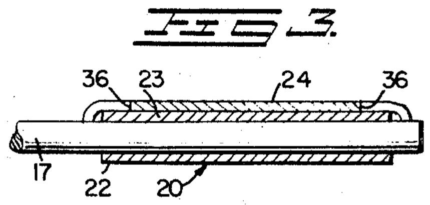
FIG. 3 is a sectional view along line 3–3 of spliced belt of FIG. 1.
Figure 4:
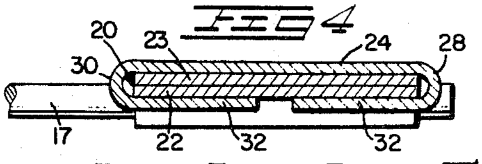
FIG. 4 is a sectional view along line 4–4 of the spliced belt of FIG. 1.

The splicing device of the instant invention hereinafter referred to as splicing clip is generally indicated as 10 in FIGS. 1 and 2 as particularly adapted to splice the ends 11 of belts generally designated 12 and 14 of electronic components 16 with axial leads 17. Each belt is formed of two tape assemblies generally designated 18 and 20 which are composed of and hold the components 16 by their leads 17 in a predetermined spacing between a lower adhesive tape 22 adhered to an upper adhesive tape 23 as shown in FIGS. 3 and 4.

Figure 2:
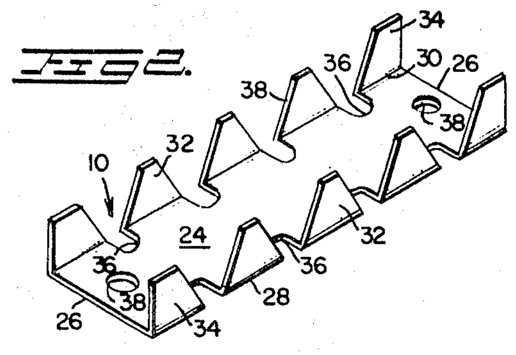
FIG. 2 is a perspective view of the splicing clip of the instant invention.

The splicing clip 10 of the instant invention as most clearly shown in FIG. 2 includes a generally rectangular base portion 24 having two opposed edges 26 of a length substantially equal to the width of tape assemblies 18 or 20. The other two opposed side edges 28 and 30 have substantially upstanding therefrom intermediate clasp members 32 and end clasp members 34, each of the members 32 and 34 being bendable along edges 28 or 30 to a position parallel to the plane of base 24 as shown in FIGS. 1 and 4. The base 24 is also provided with semicircular cutouts 36 which allows greater flexure of the splicing clip and minimize contact of the leads therewith. The clasp members 32 are formed with a decreasing width with increased distance from the base, the sides 38 being generally angled from the base at about 30° whereby the clasp is of triangular configuration.

Figures 5, 6, 7:
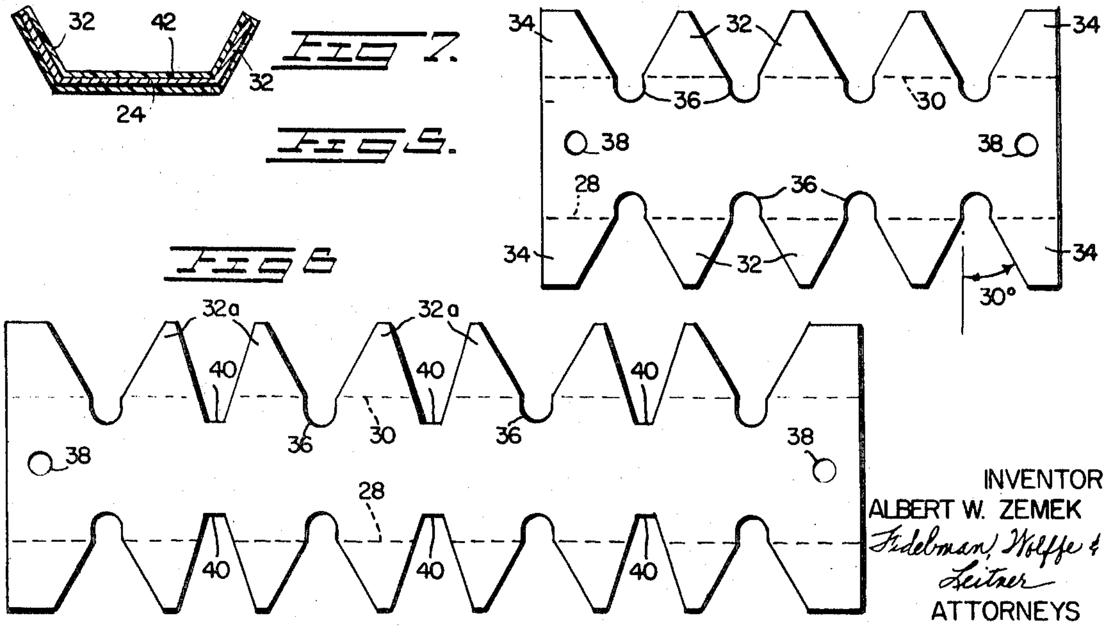
FIG. 5 is a top plan view of the pattern used in the manufacture of the splicing clip of FIG. 2.
FIG. 6 is a top plan view of a pattern for another embodiment of the splicing clip.
FIG. 7 is an end cross-sectional view of the splicing clip showing the clip with an insulative coating and with angled clasps for bulk shipment.

As shown in FIG. 5, the splicing clip of the instant invention is most conveniently formed from a blank with the clasp portions 32 and 34 being formed by substantially triangular cuts in two opposed sides of the blank. The semicircular cutouts 36 are similarly cut in the blank. Preferably, addition holes 38 are cut in either one or both ends of the blank to aid in handling, the clips being thereby stringable on a relatively stiff wire wherefrom they may be easily removed one by one. The edges 28 and 30 of the base 24 of the splicing clip are denoted in the pattern in dotted line and may take the form of slight depression to insure proper bending of the clasp members 32 and 34.

When utilized the splicing device, as shown in FIG. 2, is placed over a tape end which has been appropriately trimmed to minimize leader length the clasp members fitting between the leads of the last two components on the tape. The mating tape is placed in similar fashion with the last two component leads being placed between the clasp members not occupied by the first leads. This brings the tape ends 11 in substantial juxtaposition as shown in FIG. 1. When both tapes are appropriately positioned, the clasp members 32 and 34 are bent over base 24 and pressed thereagainst binding the tape layers 22 and 23 therebetween as shown in FIG. 4, the leads of the component being undisturbed as shown in FIG. 3.

The thus-described splicing clip has been found most satisfactory for splicing of belts where component spacing is not great. Specifically, this clip is designed for spacings between component leads in the order of 0.200 inch. Where greater distances exist between leads in the belts, such as 0.375 inch, the design of the clip of FIG. 2 is not always satisfactory because of the lack of flexibility of the relatively long side edges 28 and 30 between the cutouts. When rounding short radii areas as in an insertion machine, these edges have sometimes failed with the lead of the component slipping into the crack area. This problem has been eliminated by the modification shown by the pattern of FIG. 6. In this splicing device an intermediate stress relief slot 40 is cut in blank to form double clasp members **32*a* between each cutout 36. The relief slots 40 are cut to the depth of the cutout 36 to provide full stress relief. By this technique the length of any individual edge section 20 or 30** is minimized and thus does not bend or crack while traveling in short radius areas.

Although splicing clips may be manufactured and sold in blank form, it is preferred that the clasp members be bent upright during initial manufacture. However, as shown in FIG. 7, it is sometimes desirable to only bend the clasp members part way to the vertical in order to allow stacking and thus space saving during shipping and storage. Further, as shown in FIG. 7, an insulative coating 42 may be applied to the splicing clip to allow direct use in test equipment without the possibility of shorting. Insulative coating such as epoxy resins are well suited for this purpose although any insulative organic or inorganic coating may be applied.

The splicing clips of the instant invention have been produced from either 0.003 inch annealed brass or stainless steel. However, other metals or plastics having similar properties may be substituted. Furthermore, the invention has been described with relation to spacings of 0.200 and 0.375 but other spacings are contemplated with appropriate modification of the clasp configurations.

Since various other modifications of the present invention will occur to those skilled in the art in view of the foregoing description, I wish to be limited only by the appended claims.

I claim:

1. Lead-taped axial lead electronic component belts including at least two splicing clips binding two discontinuous belts into a continuous belt with equally spaced electronic components over the splice, each clip comprising a generally rectangular flat base member two of the opposite edges thereof being of a length substantially equal to the width of the belt tape, the other two opposing edges having bendable clasp members positioned therealong, said clasp members decreasing in width with increased distance from the edge from which it is positioned along, the clasp members of one of said edges being in direct juxtaposition with those on the other, the clasp members at each side the base edges being spaced apart a distance substantially equal to the diameter of an axial lead of said electronic component, said flat base also including semicircular cutout portions therein between each of said clasp members.

2. Lead-taped axial lead electronic component belts in accordance with claim 1 wherein said clasp members are of generally triangular configuration.

3. Lead-taped axial lead electronic component belts in accordance with claim 1 wherein the clip is composed of a metal base having an insulated coating thereover.

4 A splicing belt for tapes of lead-taped axial electronic component belts, said clip comprising a generally rectangular flat base member two of the opposite edges thereof being of a length substantially equal to the width of the belt tape, the other two opposing edges having generally upstanding bendable clasp members positioned therealong, said clasp members decreasing in width with increased distance from the edge from which they are positioned along, the clasp members on one of said edges being in direct juxtaposition with those on the other, the clasp members on each side at the base edges being spaced apart a distance substantially equal to the diameter of an axial lead of said electronic component, said clasp members including an intermediate stress-relieving cutout, said cutout bisecting the clasp member and being of substantially triangular shape decreasing in width with proximity of said base member, said flat base also including semicircular cutout portions therein between each of said clasp members.

5. The splicing clip of claim 4 wherein said base member includes a cutout portion extending from the clasp member cutout into said base substantially the same distance as said semicircular cutouts.

6. The splicing clip of claim 4 wherein said upstanding clasp members are angled outwardly from said base whereby a multiplicity of clips may be stacked in a relatively small volume.

Dedication 3,571,862.—*Albert W. Zemek*, Binghamton, N.Y. BELTED AXIAL LEAD ELECTRONIC COMPONENT SPLICING CLIP. Patent dated Mar. 23, 1971. Dedication filed Aug. 21, 1980, by the assignee, *Universal Instruments Corporation.*

Hereby dedicates to the Public the entire term of said patent.

[*Official Gazette December 16, 1980.*]